(12) United States Patent
Lee (10) Patent No.: US 8,813,128 B2
(45) Date of Patent: Aug. 19, 2014

(54) METHOD AND SYSTEM FOR PROVIDING A MULTI-DECODER BASED CHANNEL SURFING SERVICE

(75) Inventor: Ji-Young Lee, Seoul (KR)

(73) Assignee: Alticast Corporation, Seoul (KR)

( * ) Notice: Subject to any disclaimer, the term of this patent is extended or adjusted under 35 U.S.C. 154(b) by 304 days.

(21) Appl. No.: 12/727,674

(22) Filed: Mar. 19, 2010

(65) Prior Publication Data

US 2010/0251309 A1    Sep. 30, 2010

(30) Foreign Application Priority Data

Mar. 31, 2009   (KR) .................. 10-2009-0027794

(51) Int. Cl.
*H04N 5/445*    (2011.01)

(52) U.S. Cl.
USPC .............................................. 725/39; 725/41

(58) Field of Classification Search
CPC   H04N 21/462; H04N 21/4314; H04N 21/482
USPC ...................................................... 725/39, 41
See application file for complete search history.

(56) References Cited

U.S. PATENT DOCUMENTS

| | | | | | |
|---|---|---|---|---|---|
| 5,699,125 A | * | 12/1997 | Rzeszewski et al. | ........... | 725/50 |
| 5,801,785 A | * | 9/1998 | Crump et al. | .................. | 348/563 |
| 5,886,746 A | * | 3/1999 | Yuen et al. | .................... | 348/564 |
| 5,917,481 A | * | 6/1999 | Rzeszewski et al. | ......... | 715/721 |
| 6,115,080 A | * | 9/2000 | Reitmeier | ...................... | 348/731 |
| 6,154,203 A | * | 11/2000 | Yuen et al. | ....................... | 725/52 |
| 6,357,045 B1 | * | 3/2002 | Devaney | ....................... | 725/138 |
| 6,367,078 B1 | * | 4/2002 | Lasky | ............................. | 725/52 |
| 7,386,870 B2 | * | 6/2008 | Lu | .................................... | 725/62 |
| 2003/0014752 A1 | * | 1/2003 | Zaslavsky et al. | .............. | 725/40 |
| 2006/0248570 A1 | * | 11/2006 | Witwer | ......................... | 725/135 |
| 2007/0011702 A1 | * | 1/2007 | Vaysman | ........................ | 725/45 |
| 2009/0064237 A1 | * | 3/2009 | Feldstein | ........................ | 725/63 |
| 2009/0158337 A1 | * | 6/2009 | Stiers et al. | ..................... | 725/44 |

* cited by examiner

*Primary Examiner* — Nasser Goodarzi
*Assistant Examiner* — Michael Hong
(74) *Attorney, Agent, or Firm* — Maier & Maier, PLLC (57) ABSTRACT

Methods and systems for providing a multi-decoder based channel surfing service. One aspect provides a method of providing a multi-decoder based channel surfing service for a digital broadcasting system that is connected by a network to a broadcast receiver. This includes: extracting a video signal from each AV (audio/video) signal for a multiple number of broadcast channels; generating a first and a second channel-surfing video source using the multiple extracted video signals, where the first and second channel-surfing video sources include sub-videos for different broadcast channels; and transferring the first and second channel-surfing video sources and source configuration information regarding the first and second channel-surfing video sources to the broadcast receiver, with the broadcast receiver generating a channel-surfing screen by simultaneously decoding the first and second channel-surfing video sources by way of a first and a second decoder.

6 Claims, 7 Drawing Sheets

| KBS1 | KBS2 | MBC | SBS | A | A |
|---|---|---|---|---|---|
| A | A | A | A | A | A |
| A | A | A | A | A | A |
| A | A | A | A | A | A |
| A | A | A | A | A | A |
| A | A | A | A | A | A |

| KBS1 | KBS2 | MBC | SBS | A | A |
|------|------|-----|-----|---|---|
| A | A | A | A | A | A |
| A | A | A | A | A | A |
| A | A | A | A | A | A |
| A | A | A | A | A | A |
| A | A | A | A | A | A |

Fig. 7

METHOD AND SYSTEM FOR PROVIDING A MULTI-DECODER BASED CHANNEL SURFING SERVICE

CROSS-REFERENCE TO RELATED APPLICATIONS

This application claims the benefit of priority to Korean Patent Application No. 10-2009-0027794, filed with the Korean Intellectual Property Office on Mar. 31, 2009, the disclosure of which is incorporated herein by reference in its entirety.

BACKGROUND

1. Technical Field

The present invention relates to a method and system for providing a channel surfing service based on multiple decoders, more particularly to a method and system that enable users to surf through a large number of broadcast channels within a short period of time.

2. Description of the Related Art

In the past, broadcasting services were provided using analog signals, but recent times have seen the appearance of digital broadcasting services.

As a result of active research on digital broadcasting standards, broadcast signals including video, audio, and data components can be compressed into digital signals, allowing for more channels for TV broadcasting.

Also, with the development of related applications, data broadcasting services are now being provided which not only enable users to view the broadcasts, but also provide data (supplementary information) directly or indirectly related to the broadcasts, such as for weather, news, stock information, e-mail, electronic program guides (EPG), TV shopping, banking, telephone services, and Internet searching.

Although the use of digital compression has led to improved picture quality and higher transmission efficiency, the speed for changing channels has become slower than that for analog broadcasting, due to the times required for tuning, decoding, etc., at the broadcast receiver.

Thus, a digital broadcasting system may provide an electronic program guide (EPG) to allow the user to quickly surf channels.

In the digital broadcasting system, a certain EPG generator unit may receive video signals related to currently broadcast programs and process the signals (convert the signals to smaller sizes) to provide an electronic program guide that allows a user to see at a glance the video, channel name, program information, etc., related to currently broadcast programs.

Existing electronic program guides may be independently configured for a particular number of channels, e.g. twelve to sixteen, so when there are a large number of broadcast channels, the digital broadcast system may have to generate a multiple number of electronic program guides. Also, the electronic program guides may be prepared separately according to the type of broadcasting medium, such as ground waves, satellite waves, cable, etc.

Furthermore, the multiple number of electronic program guides may be transferred to the broadcast receiver through a different channel from the ones used for broadcast programs.

Thus, according to the related art, the greater the number of channels provided to the users, the greater the number of electronic program guides that have to be generated, and since these have to be transferred via a separate band, the greater the loss in bandwidth.

Also, according to the related art, since the electronic program guides are provided separately, if a user wishes to check a broadcast channel that is not included in the electronic program guide currently viewed by the user, the digital broadcasting system may have to provide a new electronic program guide to the broadcast receiver. In this case, the broadcast receiver may have to decode the new electronic program guide again before outputting, causing the user to wait for a long standby period.

SUMMARY

In order to resolve the problems addressed above, an aspect of the present invention proposes a method and system for providing a channel surfing service by which a user may quickly check a large number of channels.

Another objective of the invention is to provide a method and system for providing a channel surfing service by which a broadcast receiver having multiple decoders can configure a surfing screen in various styles for various broadcast channels within a short period of time.

To achieve the above objectives, an aspect of the invention provides a method of providing a multi-decoder based channel surfing service for a digital broadcasting system that is connected by a network to a broadcast receiver. This method includes: extracting a video signal from each AV (audio/video) signal for a multiple number of broadcast channels; generating a first and a second channel-surfing video source using the multiple extracted video signals, where the first and second channel-surfing video sources include sub-videos for different broadcast channels; and transferring the first and second channel-surfing video sources and source configuration information regarding the first and second channel-surfing video sources to the broadcast receiver, with the broadcast receiver generating a channel-surfing screen by simultaneously decoding the first and second channel-surfing video sources by way of a first and a second decoder.

An embodiment of the invention can further include encoding each of the first and second channel-surfing video sources; and encoding the source configuration information.

Preferably, the source configuration information may include at least one of a location and size of the sub-video included in each of the first and second channel-surfing video sources, and a broadcast channel number, name, and locator information of the sub-video.

An embodiment of the invention can further include transferring screen configuration information to the broadcast receiver, where the broadcast receiver may configure a channel-surfing screen, which may include at least a part of the sub-videos, using the source configuration information and the screen configuration information.

Preferably, the broadcast receiver can configure the channel-surfing screen using user information.

Here, the user information can include at least one of the preferred channel, main viewing time, viewing day, VOD purchase history, age, gender, and area of residence.

Preferably, the first and second channel-surfing video sources may be allotted to a single transport stream.

Preferably, the first and second channel-surfing video sources may include sub-videos of broadcast channels that have high-ranking viewer ratings.

More preferably, the first channel-surfing video source may include the sub-video of a broadcast channel having a high-ranking viewer rating for a different genre from that for the second channel-surfing video source.

Alternatively, the first and second channel-surfing video sources may include sub-videos according to predefined genres.

According to an embodiment of the invention, the operation of generating the channel-surfing video sources may be to generate the channel-surfing video sources in a number corresponding to the number of decoders equipped in the broadcast receiver.

Another aspect of the invention provides a digital broadcasting system connected by a network to a broadcast receiver. This digital broadcasting system includes: a video signal extractor unit for extracting a video signal from each of a multiple number of broadcast channel signals; a video source generator unit for generating a first and second channel-surfing video source using the multiple extracted video signals, where the first and second channel-surfing video sources include sub-videos for different broadcast channels; and a source configuration information encoder for encoding source configuration information of the first and second channel-surfing video sources, while the broadcast receiver generates a channel-surfing screen by simultaneously decoding the first and second channel-surfing video sources by way of a first and second decoder.

Yet another aspect of the invention provides a broadcast receiver for providing a channel surfing service. The broadcast receiver includes: a tuner for receiving a multiple number of channel-surfing video sources, each of which include a sub-video for a different broadcast channel, and source configuration information for the multiple number of channel-surfing video sources from a digital broadcasting system; a source configuration information decoder for decoding the source configuration information; a plurality of video decoders for decoding the multiple number of channel-surfing video sources, respectively; and a screen configuring unit for configuring a channel-surfing screen using the decoded source configuration information and the multiple sub-videos included in the channel-surfing video sources.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like numerals are used to refer to like elements.

Certain embodiments of the invention will be described below in more detail with reference to the accompanying drawings. For better understanding, the same elements are indicated by the same numerals regardless of the figure number.

Figure 1:
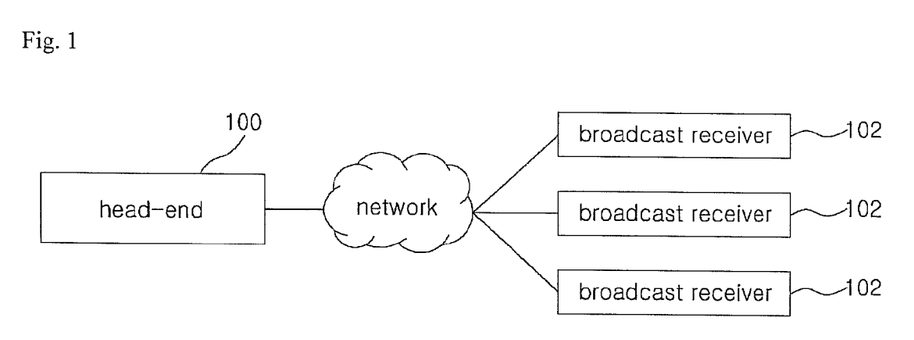
FIG. 1 illustrates a digital broadcasting system according to an embodiment of the invention.

FIG. 1 illustrates a digital broadcasting system according to an embodiment of the invention.

As illustrated in FIG. 1, a digital broadcasting system according to an embodiment of the invention can include a head-end 100 and a multiple number of broadcast receivers 102-1 to 102-n (hereinafter collectively referred to by the numeral "102") connected by a network to the head-end 100.

Here, a network can include a ground wave broadcasting network, a cable broadcasting network, a satellite communication network, and the Internet.

The head-end 100 may convert audio and video signals (AV signals) for various broadcast channels into a predefined format and transfer broadcast signals, which are audio and video signals coupled with data, to the broadcast receivers 102.

Also, the head-end 100 may provide a scheduling function for each of the broadcast programs, as well as perform scrambling to prevent access for nonsubscribers.

In addition, the head-end 100 can be equipped with a separate communication server (e.g. a return path server) for processing the demands via an upchannel, to provide Internet services and various other communication services.

A broadcast receiver 102 may selectively receive and output the broadcast signals corresponding to a particular broadcast channel, from among the broadcast signals transferred by the head-end 100.

Here, the broadcast receiver 102 can be a set-top box for decoding broadcast signals and running applications that couple with the data, but is not thus limited.

The broadcast receiver 102 may process the broadcast signals corresponding to the channel selected by the user and may provide the signals to the user.

According to a preferred embodiment of the invention, the broadcast receiver 102, equipped with a multiple number of decoders, can generate a channel-surfing screen (an electronic program guide).

The head-end 100 according to an embodiment of the invention may extract video signals from the AV signals for the multiple number of broadcast channels and may generate a multiple number of channel-surfing video sources using the extracted video signals.

Here, the channel-surfing video sources may include sub-videos for the multiple broadcast channels.

A sub-video refers to a signal that has been converted to a smaller size by resizing a video signal provided by a broadcasting company or a program provider.

Here, the size can be defined as the resolution. For example, a sub-video according to an embodiment of the invention can be defined as having a resolution of 320×180.

It will be apparent to the skilled person that while the sub-video can include video clips of the program provided by each broadcast channel, it is not thus limited, and the sub-video can also include still images, for example.

Figure 2:
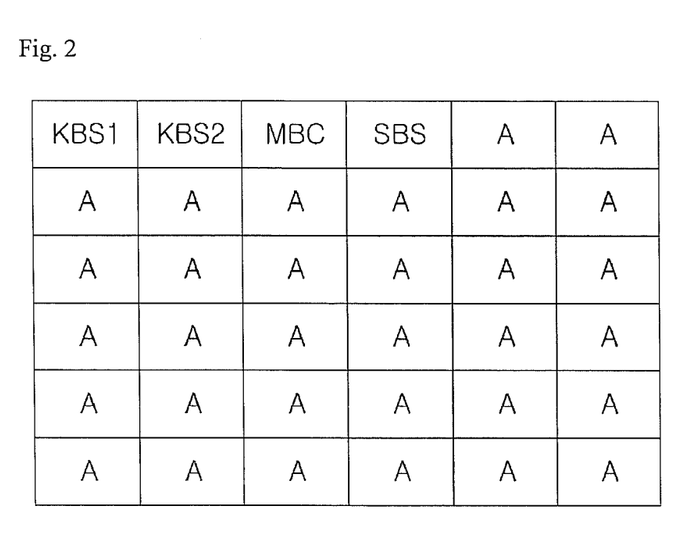
FIG. 2 illustrates an example of a channel-surfing video source according to an embodiment of the invention.

As described above, the head-end 100 according to an embodiment of the invention can generate multiple channel-surfing video sources, while each channel-surfing video source can include a particular number of sub-videos, as illustrated in FIG. 2.

For example, if the resolution of the sub-videos is set as described above, and the resolution of the broadcast receiver 102 is set to 1920×1080, then one channel-surfing video source can include about 36 sub-videos.

However, the number of sub-videos included in a channel-surfing video source can vary according to the resolution of the broadcast receiver.

According to an embodiment of the invention, each channel-surfing video source may preferably include sub-videos of different broadcast channels.

The channel-surfing video sources generated as described above may be encoded separately and transferred to the broadcast receiver 102.

The head-end 100 according to an embodiment of the invention can use various compression standards in encoding the channel-surfing video sources, preferably those that follow the H.264 standard, which provides high compression efficiency.

By applying the H.264 standard as described above, the channel-surfing video sources can be generated that include a large number of sub-videos.

H.264 is a video compression standard created to transfer videos over a smaller bandwidth, and is also referred to as the MPEG-4 part10: AVC (advanced video coding) standard. H.264 guarantees an improvement of about 50% in video compression rate at most bit-rates, over the previous compression technology.

The broadcast receiver 102 according to an embodiment of the invention may be equipped with a multiple number of decoders, and using the multiple decoders, may simultaneously decode the multiple number of channel-surfing video sources transferred by the head-end 100.

After decoding the multiple channel-surfing video sources simultaneously, the broadcast receiver 102 may generate a channel-surfing screen, using the source configuration information of the channel-surfing video sources and the screen configuration information transferred by the head-end 100.

Here, the source configuration information is information for identifying the sub-videos included in each of the channel-surfing video sources and can include the size (resolution) and location within the video source of each sub-video, as well as the broadcast channel number, name, and locator information for each sub-video.

The screen configuration information is information regarding the type of channel-surfing screen, i.e. the electronic program guide.

Figure 3:
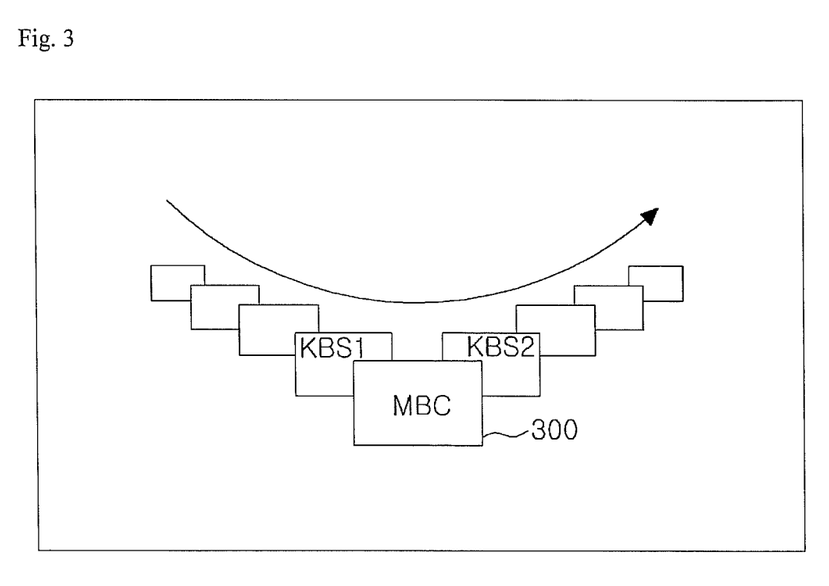
FIG. 3 illustrates an example of a channel-surfing screen according to an embodiment of the invention.
Figure 4:
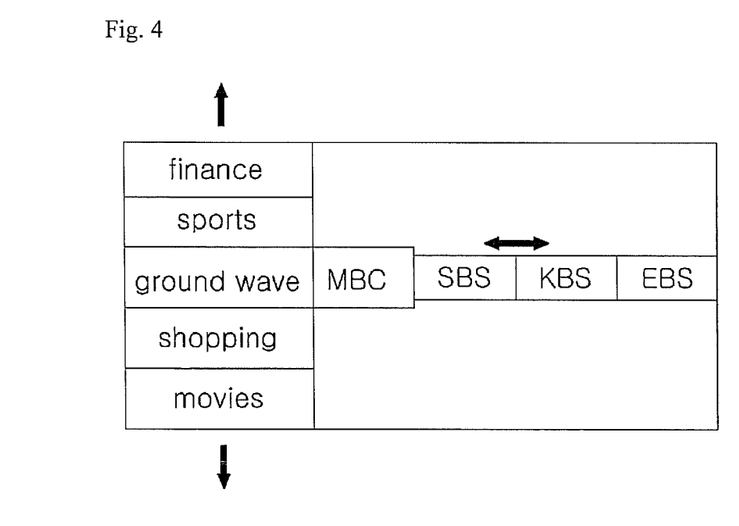
FIG. 4 illustrates another example of a channel-surfing screen according to an embodiment of the invention.

The broadcast receiver 102 can generate a channel-surfing screen, some example types of which are illustrated in FIG. 3 and FIG. 4, using the channel-surfing video sources, source configuration information, and screen configuration information.

Modern broadcast receivers 102 are generally built with a PIP (picture-in-picture) function and are thus equipped with at least two decoders. As such, the head-end 100 according to an embodiment of the invention may provide at least two channel-surfing video sources to the broadcast receiver 102.

Providing a multiple number of channel-surfing video sources makes it possible to configure the channel-surfing screen in more various ways and to avoid delays when changing pages, compared to the case of providing one channel-surfing video source.

If 36 sub-videos are included in one channel-surfing video source, and one channel-surfing video source is provided to the broadcast receiver 102, the broadcast receiver 102 can configure the channel-surfing screen using a part of only the 36 sub-videos. Hence, if the current channel-surfing video source does not carry the sub-video of the broadcast channel wanted by the user, or if the user requests a guide to additional broadcast channels other than the 36 broadcast channels, the broadcast receiver 102 may have to receive new channel-surfing video sources from the head-end 100 and decode them, causing the user to wait for a long standby period.

Thus, an embodiment of the invention may entail providing the channel-surfing video sources to a broadcast receiver 102 equipped with multiple decoders, i.e. a multi-decoder, with the channel-surfing video sources provided in a number corresponding to the number of decoders, so that the channel-surfing screen can be configured using a greater number of sub-videos. In this way, an embodiment of the invention can provide the user with various channel-surfing screens more quickly.

A description on the compositions of a head-end and a broadcast receiver according to an embodiment of the invention will be provided as follows with reference to FIG. 5 and FIG. 6.

Figure 5:
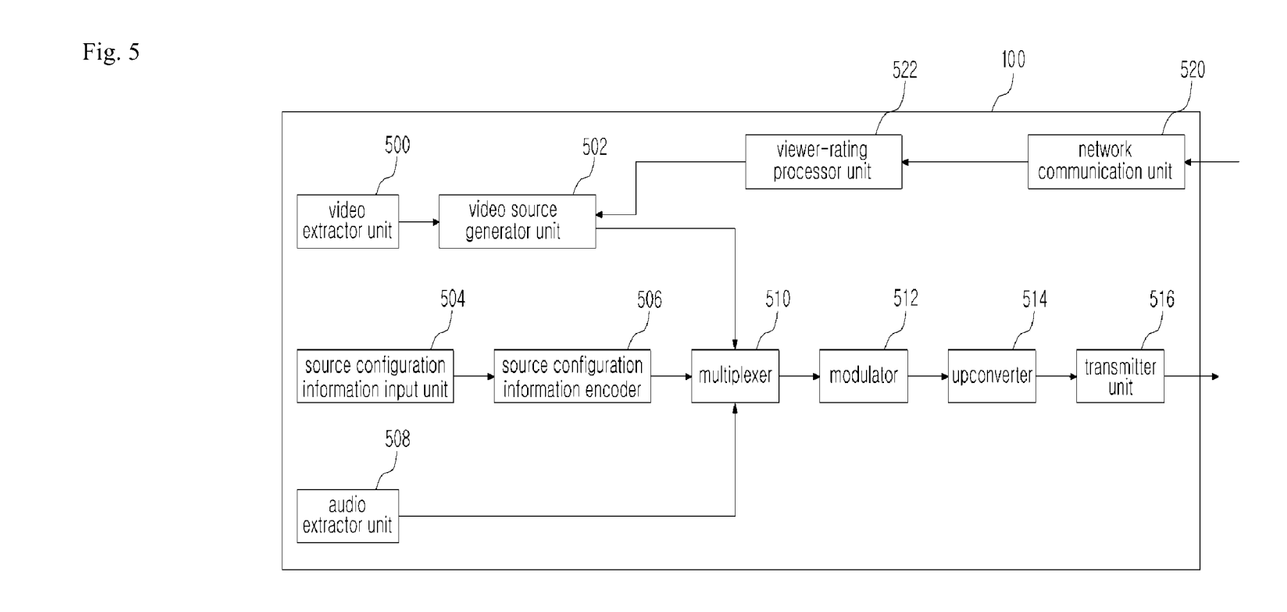
FIG. 5 illustrates the composition of a head-end according to an embodiment of the invention.

FIG. 5 illustrates the composition of a head-end according to a preferred embodiment of the invention.

As illustrated in FIG. 5, a head-end 100 according to an embodiment of the invention can include a video extractor unit 500, a video source generator unit 502, a source configuration information input unit 504, a source configuration information encoder 506, an audio extractor unit 508, a multiplexer 510, a modulator 512, an upconverter 514, and a transmitter unit 516.

The video extractor unit 500 may extract video signals from AV signals for a multiple number of broadcast channels. That is, the video extractor unit 500 may receive AV signals provided by outside broadcast providers or by various broadcasting stations and selectively output the video signals.

The video source generator unit 502 may process the extracted video signals to generate a multiple number of channel-surfing video sources.

The video source generator unit 502 may generate channel-surfing video sources that include a particular number of sub-videos, which have been converted into smaller sizes (lower resolution) from the extracted video signals.

The generated channel-surfing video sources may be outputted after being encoded in accordance with a predefined algorithm.

According to an embodiment of the invention, the video source generator unit 502 may determine the number of sub-videos that are to be included in one channel-surfing video source in consideration of the resolution of the broadcast receiver 102 and the predefined resolution of the sub-videos, and may furthermore generate a multiple number of channel-surfing video sources based on the number of decoders included in the broadcast receiver 102.

For example, if the resolution of the broadcast receiver 102 is set to 1920×1080, and the resolution of the sub-videos is set to 320×180, then the video source generator unit 502 may generate channel-surfing video sources that each includes about 36 sub-videos.

Also, if there are n (where n is a natural number greater than or equal to 2) decoders equipped in the broadcast receiver 102, then the video source generator unit 502 may generate an n number of channel-surfing video sources.

Thus, for the resolutions mentioned above, the head-end 100 can provide the broadcast receiver 102 with 36×n sub-videos for channel surfing, and the broadcast receiver 102 can configure a channel-surfing screen using 36×n sub-videos.

The following descriptions will focus on an example in which there are two decoders in the broadcast receiver 102, and hence the video source generator unit 502 generates a first and a second channel-surfing video source.

According to a preferred embodiment of the invention, the video source generator unit 502 can determine the sub-videos that will be included in the channel-surfing video sources, using viewer ratings.

The head-end 100 according to an embodiment of the invention can further include a network communication unit 520 and a viewer-rating processor unit 522.

The network communication unit 520 may be connected with the broadcast receiver 102 by a return path separate from the broadcasting network, to receive the viewing information of the user from each of the broadcast receivers 102.

Here, the network communication unit 520 can receive information on the channel currently selected by each user, together with an identifier of the broadcast receiver 102.

The viewer-rating processor unit 522 may collect the statistics of the viewer information received from the multiple broadcast receivers 102 and perform a procedure for computing the viewer ratings' rankings.

Here, the viewer-rating processor unit 522 can compute not only the overall viewer rating rankings but also the viewer rating rankings for predefined genres.

The viewer-rating processor unit 522 can also receive the users' personal information, such as age, region, etc., as transferred from the broadcast receiver 102. This can be utilized by the viewer-rating processor unit 522 to compute viewer rating rankings separately according to the region and age of the user.

The users' personal information can be pre-stored in a separate database, which can be utilized by the viewer-rating processor unit 522 to compute viewer rating rankings according to the personal information of the user.

Using the viewer ratings information computed in the viewer-rating processor unit 522, the video source generator unit 502 according to an embodiment of the invention can selectively include the sub-videos of broadcast channels having high-ranking viewer ratings in the first and second channel-surfing video sources.

For example, in cases where there are 36 sub-videos included in one channel-surfing video source, the first channel-surfing video source can include the sub-videos of broadcast channels ranking 1st to 36th in viewer ratings, while the second channel-surfing video source can include the sub-videos for broadcast channels ranking 37th to 72nd.

Here, the video source generator unit 502 can also generate the first and second channel-surfing video sources using information on not only the overall viewer ratings but also on the viewer ratings rankings for each genre.

In this case, the video source generator unit 502 can include the sub-videos of broadcast channels ranking 1st to 18th in the drama genre and those ranking 1st to 18th in the entertainment genre in the first channel-surfing video source, while including broadcast channels ranking 1st to 18th in the sports genre and those ranking 1st to 18th in the movie genre in the second channel-surfing video source.

While the above descriptions are provided for an example in which the video source generator unit 502 uses the viewer ratings computed by the head-end 100 itself, it will be apparent to the skilled person that the viewer ratings information can be provided from the outside.

The source configuration information input unit 504 may receive source configuration information for channel-surfing video sources inputted by an administrator.

Here, the source configuration information is information for identifying the sub-videos included in each of the first and second channel-surfing video sources and can include location, size, channel number, name, and locator information.

Here, the location refers to information on the coordinates of each sub-video within a video source having a structure such as that shown in FIG. 2.

The locator information is a means for indicating objects on a broadcasting network and can be expressed by a combination of original network ID, network ID, and service ID.

The source configuration information encoder 506 may encode the source configuration information inputted as described above into a broadcastable form.

The audio extractor unit 508 may selectively extract only audio signals from the AV signals for the multiple number of broadcast channels.

The multiplexer 510 may receive the multiple channel-surfing video sources, the configuration information of each video source, and the audio signals for the multiple channels and combine them into one broadcasting signal.

Preferably, the multiple channel-surfing video sources according to an embodiment of the invention can be allotted to a single transport stream.

Here, the single stream may be the basic unit for tuning the broadcast receiver 102, and if the multiple channel-surfing video sources are allotted to a single transport stream as described above, the broadcast receiver 102 can reduce tuning times and thereby quickly configure a channel-surfing screen.

The modulator 512 may perform a modulating process for the combined broadcast signal according to the broadcasting medium (e.g. ground wave, cable, satellite), and the upconverter 514 may perform a process of upconverting the modulated signal into a desired transmittable frequency.

The transmitter unit 516 may transmit the upconverted signal via the broadcasting medium.

Figure 6:
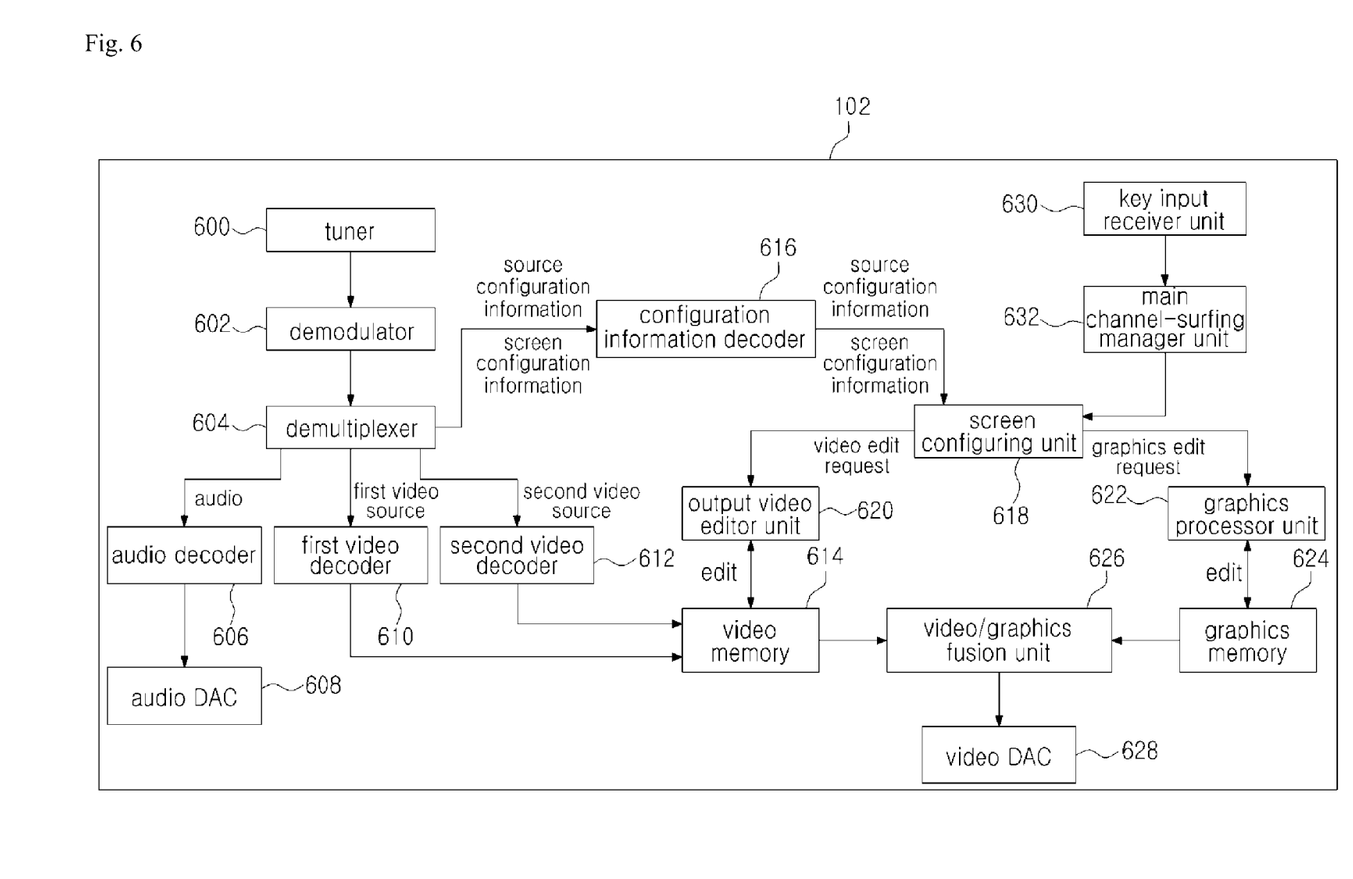
FIG. 6 illustrates the composition of a broadcast receiver according to an embodiment of the invention.

FIG. 6 illustrates the composition of a broadcast receiver according to an embodiment of the invention.

Referring to FIG. 6, a tuner 600 may tune in to a particular frequency to selectively receive the broadcast signal of a particular channel from among the broadcast signals transferred by the head-end 100.

A demodulator 602 may demodulate the signal received by the tuner 600, and a demultiplexer 604 may extract the audio, video, and data signals from the demodulated signal. According to an embodiment of the invention, the demultiplexer 604 can extract and output the multiple number of channel-surfing video sources (video signals), source configuration information (data), and audio signals needed for the channel surfing service.

The audio signals outputted by the demultiplexer 604 may be decoded by an audio decoder 606 and outputted as an audio frame, and the audio frame may be converted by an audio DAC (digital-analog converter) 608 into an analog signal to be outputted through a speaker.

According to an embodiment of the invention, the video signals extracted by the demultiplexer 604, i.e. the channel-surfing video sources, may be decoded by a multiple number of video decoders 610, 612.

In the above example, the head-end 100 may transfer a first and a second channel-surfing video source, while a first video decoder 610 (hereinafter referred to as a "first decoder") and a second decoder 612 (hereinafter referred to as a "second decoder") equipped in the broadcast receiver 102 may decode the first channel-surfing video source and the second channel-surfing video sources, respectively.

The decoded sub-videos may be temporarily stored in a video memory 614.

As described above, the number of video decoders may correspond with the number of channel-surfing video sources, so that the multiple number of video sources for channel surfing can be decoded simultaneously.

According to an embodiment of the invention, all of the sub-videos included in the multiple channel-surfing video sources can be used for configuring the channel-surfing screen.

The demultiplexer 604 according to an embodiment of the invention may output the encoded source configuration information, and the outputted source configuration information may be decoded by a configuration information decoder 616.

Also, the information outputted by the demultiplexer 604 can additionally include screen configuration information, i.e. information on the type of channel-surfing screen, and the screen configuration information may also be decoded by the configuration information decoder 616.

According to an embodiment of the invention, the screen configuration information may be provided from the head-end 100.

The screen configuring unit 618 may receive the source configuration information and screen configuration information decoded as described above and may use them to make a request to an output video editor unit 620 and a graphics processor unit 622 for an editing of the channel-surfing screen configuration.

Upon receiving an edit request, the output video editor unit 620 may perform various editing processes of clipping, scaling, and transiting the desired areas of the multiple sub-videos stored in the video memory 614, i.e. the multiple sub-videos being simultaneously decoded by the first decoder 610 and second decoder 612.

Here, the output video editor unit 620 may perform the above editing using the source configuration information.

The graphics processor unit 622 may perform editing processes for the channel-surfing screen using the information stored in a graphics memory 624.

The edit results of the output video editor unit 620 and the graphics processor unit 622 may be stored in the video memory 614 and graphics memory 624, respectively, and may be outputted through a video/graphics fusion unit 626 to a video DAC 628.

The screen configuring unit 618 according to an embodiment of the invention may make a request for an edit to the output video editor unit 620 and the graphics processor unit 622 through key inputs made by the user to the key input receiver unit 630 and the main channel-surfing manager unit 632. Here, the key input of the user can include moving the center channel of the channel-surfing screen (e.g. the channel displayed in the center area in FIG. 3), and changing pages to a different channel-surfing screen, as well as inputting up/down/select, etc., for the channels.

As described above, the multiple channel-surfing video sources according to an embodiment of the invention can mainly include the sub-videos of channels having high viewer ratings. Accordingly, the screen configuring unit 618 can request the output video editor unit 620 to perform the editing processes such that the sub-videos of channels having high viewer ratings in the first and second channel-surfing video sources are precedentially included in the channel-surfing screen.

For example, if 12 sub-videos can be displayed on one channel-surfing screen, the screen configuring unit 618 may request an edit such that the sub-videos of the broadcast channels which rank at the top 12 in viewer ratings are outputted precedentially.

Not limited to the above example, the screen configuring unit 618 can also make an edit request based on the viewer ratings rankings for each genre, and furthermore can make a video edit request based on the user information stored in the broadcast receiver 102.

Here, the user information can include the user's preferred channels, main viewing times, viewing days, VOD purchase history, age, gender, area of residence, etc.

If the channel-surfing screen is to be configured based on user information, then the screen configuring unit 618 can make an edit request, using the user information described above, such that the sub-videos of channels predicted to be of liking to the user, from among the sub-videos currently being decoded, are precedentially included in the channel-surfing screen.

In examples where the channel-surfing screen is configured as in FIG. 3, the screen configuring unit 618 according to an embodiment of the invention can have the sub-video of the channel having the highest overall viewer rating, or the sub-video of the channel predicted to be of liking to the user, displayed on the center area 300 in accordance with various criteria such as those described above.

According to an embodiment of the invention, the broadcast receiver 102 can simultaneously decode a multiple number of channel-surfing video sources, and thus can provide the user with information on numerous channels in various styles.

For example, if the channel-surfing screen is configured as in FIG. 3, and the sub-videos are to be outputted according to overall viewer rating, then when the user wishes to move the sub-video using a remote control, the sub-videos corresponding to the viewer rating rankings next in line in the direction of the arrow may sequentially be magnified and outputted on the center area 300.

Whereas those cases of providing only a single channel-surfing video source may cause delays for decoding sub-videos included in other channel-surfing video sources, an embodiment of the invention makes it possible to decode multiple channel-surfing video sources simultaneously, so that a large number of sub-videos can be provided to the user without delays.

Also, even when a channel-surfing screen type such as that shown in FIG. 4 is used, the user can be provided with the channel-surfing screen without delays for multiple channels, because a large number of sub-videos are being decoded simultaneously.

Figure 7:
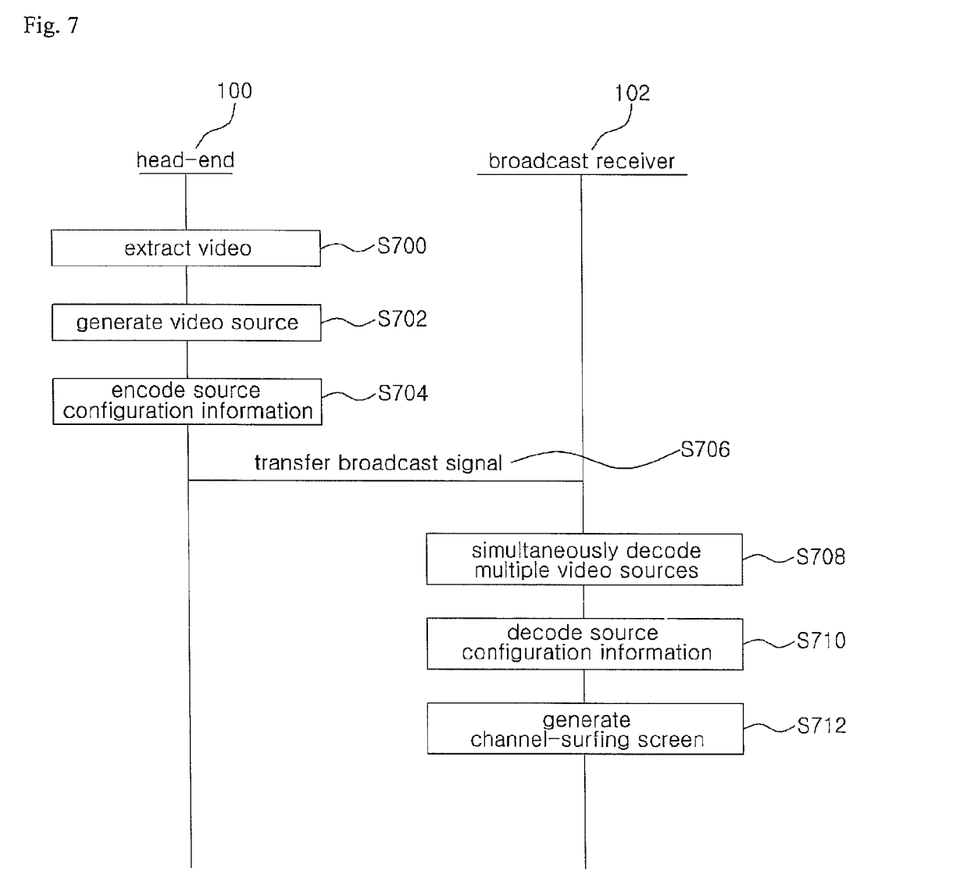
FIG. 7 is a flow diagram illustrating the process for a channel surfing service according to an embodiment of the invention.

FIG. 7 is a flow diagram illustrating the process for a channel surfing service according to an embodiment of the invention.

Referring to FIG. 7, the head-end 100 may extract video signals from AV signals for a multiple number of broadcast channels (operation 700) and process the extracted video signals to generate a first and a second channel-surfing video source (operation 702).

In operation 702, the viewer ratings for the multiple channels can be considered, so that the first and second channel-surfing video sources can be generated to include the sub-videos of channels having high-ranking viewer ratings. The first and second channel-surfing video sources thus generated may be encoded according to a predefined algorithm.

At the same time, the head-end 100 may encode the configuration information for the multiple channel-surfing video sources generated in operation 702, i.e. the source configuration information (operation 704).

Afterwards, the head-end 100 may transfer a broadcast signal, which includes the first and second channel-surfing video sources and their configuration information, to the broadcast receivers 102 (operation 706).

The broadcast receiver 102 may simultaneously decode the first channel-surfing video source and the second channel-surfing video source included in the broadcast signal, using a first and second decoder (operation 708).

Also, the broadcast receiver 102 may decode the source configuration information included in the broadcast signal (operation 710).

The broadcast receiver 102 may edit the multiple number of sub-videos included in the decoded source configuration information and first and second channel-surfing video sources, to generate a channel-surfing screen (operation 712).

In operation 712, the broadcast receiver 102 may additionally use screen configuration information received from the head-end 100, and when there is a particular key input by the user checking the channel-surfing screen, may modify the channel-surfing screen according to the key inputted.

As set forth above, an embodiment of the invention can provide broadcast information for various channels within a short period of time by providing a multiple number of channel-surfing video sources to a broadcast receiver equipped with a multiple number of decoders.

Also, an embodiment of the invention can prevent delays when a user changes pages in the channel-surfing screen.

Moreover, an embodiment of the invention makes it possible to configure the channel-surfing screen in various ways according to user preferences, etc.

The embodiments of the invention described in the above are for illustrative purposes only. It is to be appreciated that those of ordinary skill in the art can modify, alter, and make additions to the embodiments in various ways without departing from the spirit and scope of the present invention, and that such modification, alterations, and additions are encompassed in the scope of claims below.

What is claimed is:

1. A method of providing a multi-decoder based channel surfing service for a digital broadcasting system connected by a network to a broadcast receiver, the method comprising:
    extracting a video signal from each AV (audio/video) signal for a plurality of broadcast channels, at a headend;
    computing overall viewer ratings and viewer ratings for predefined genres using statistics of viewership information received from multiple broadcast receivers, at the headend;
    generating a first and a second channel-surfing video source at the headend, the first and second channel-surfing video sources including sub-video of broadcast channels having viewer rating rankings higher than a predefined ranking from among the plurality of extracted video signals, the first channel-surfing video source including sub-videos of broadcast channels having a high-ranking viewer rating for a different genre from that for the second channel-surfing video source; and
    transferring the first and the second channel-surfing video sources and source configuration information regarding the first and the second channel-surfing video sources to the broadcast receiver from the headend, the source configuration information including a location and a size of the sub-video include in each of the first and second channel-surfing video source and a broadcast channel number, name, and locator information of the sub-video,
    wherein the broadcast receiver simultaneously decodes the first and the second channel-surfing video sources by way of a first and a second decoder, and if a key input by a user is received, the broadcast receiver generates a channel surfing-screen by editing the sub-video included in the first and the second channel-surfing video sources,
    wherein the broadcast receiver simultaneously decodes the first and the second channel-surfing video sources by way of a first and second decoder, and if a key input by a user is received, the broadcast receiver generates a channel surfing-screen by editing the sub-videos including in the first and the second channel-surfing video source,
    wherein the generating of the channel-surfing video sources is to generate the channel-surfing video sources in a number corresponding to a number of decoders equipped in the broadcast receiver.

2. The method of claim 1, further comprising:
    encoding each of the first and the second channel-surfing video sources; and
    encoding the source configuration information.

3. The method of claim 1, wherein the broadcast receiver configures the channel-surfing screen using user information.

4. The method of claim 1, wherein the first and the second channel-surfing video sources include sub-videos according to predefined genres.

5. The method of claim 3, wherein the user information includes at least one of a preferred channel, main viewing time, viewing day, VOD purchase history, age, gender, and area of residence.

6. A digital broadcasting system connected by a network to a broadcast receiver, the system comprising:
    a video signal extractor unit for extracting a video signal from each of a plurality of broadcast channel signals;
    a viewer-rating processor unit for collecting the viewer information received from multiple broadcast receivers and performing a procedure at a head end for computing the viewer ratings;
    a video source generator unit for generating a first and a second channel-surfing video source, the first and second channel-surfing video sources including sub-videos of broadcast channels having viewer rating rankings higher than a predefined ranking from among the plurality of extracted video signals, the first channel-surfing video source including sub-videos of broadcast channels having a high-ranking viewer rating for a different genre from that for the second channel-surfing video source; and
    a source configuration information encoder for encoding source configuration information of the first and the second channel-surfing video sources, the source configuration information including a location and a size of the sub-video including in each of the first and second channel-surfing video sources and a broadcast channel number, name, and locator information of the sub-video,
    wherein the broadcast receiver simultaneously decodes the first and the second channel-surfing video sources by way of a first and a second decoder, and if a key input by a user is received, the broadcast receiver generates a channel surfing-screen by editing the sub-video include in the first and second channel-surfing video sources,
    wherein the video source generator unit generates the channel-surfing video sources in a number corresponding to a number of decoders equipped in the broadcast receiver.

* * * * *